United States Patent
Lu et al.

(10) Patent No.: US 8,888,056 B2
(45) Date of Patent: Nov. 18, 2014

(54) DETACHABLE LIFTING MODULE

(75) Inventors: Der-Wei Lu, New Taipei (TW); Chung-Cheng Hu, New Taipei (TW)

(73) Assignee: Syncmold Enterprise Corp., New Taipei (TW)

(*) Notice: Subject to any disclaimer, the term of this patent is extended or adjusted under 35 U.S.C. 154(b) by 0 days.

(21) Appl. No.: 13/589,075

(22) Filed: Aug. 17, 2012

(65) Prior Publication Data

US 2013/0306818 A1 Nov. 21, 2013

(30) Foreign Application Priority Data

May 21, 2012 (TW) ............................. 101209547 U (51) Int. Cl.
*A47F 5/00* (2006.01)

(52) U.S. Cl.
USPC .................................. 248/123.11; 248/162.1

(58) Field of Classification Search
USPC .............. 248/121, 122.1, 123.11, 123.2, 161, 248/162.1, 405, 407, 411, 159, 157, 917, 248/918, 919; 211/26, 103; 361/FOR. 104, 361/FOR. 105, 679.21; 269/289 R, 291, 55, 269/60; 403/80, 331

See application file for complete search history.

(56) References Cited

U.S. PATENT DOCUMENTS

| | | | | |
|---|---|---|---|---|
| 3,368,784 | A * | 2/1968 | Peterson | 248/245 |
| 6,957,794 | B2 * | 10/2005 | Landreville et al. | 248/124.2 |
| 7,931,420 | B2 * | 4/2011 | Maffeis | 403/400 |
| 8,152,115 | B2 * | 4/2012 | Blichmann | 248/159 |
| 2005/0236530 | A1 * | 10/2005 | Weatherly et al. | 248/122.1 |

* cited by examiner

*Primary Examiner* — Alfred J Wujciak (74) *Attorney, Agent, or Firm* — Li & Cai Intellectual Property (USA) Office (57) ABSTRACT

A detachable lifting module includes a fixing support, a sliding unit, a mounting unit, and at least one fastening element. The fixing support has a first track defining a first space and a second track defining a second space. The sliding unit includes a first sliding element detachably disposed on the first track and a second sliding element detachably disposed on the second track. The first sliding element has a first pressing portion received in the first space, and the second sliding element has a second pressing portion received in the second space. The fastening element is capable of connecting the first and second sliding elements. The first and second pressing portions are respectively received by the first and the second spaces and respectively engaging the first and second tracks to lock the sliding unit by adjusting the fastening element.

8 Claims, 6 Drawing Sheets

DETACHABLE LIFTING MODULE

BACKGROUND OF THE INVENTION

1. Field of the Invention

The instant disclosure relates to a lifting module, and more particularly to a detachable lifting stand.

2. Description of Related Art

Figure 1:
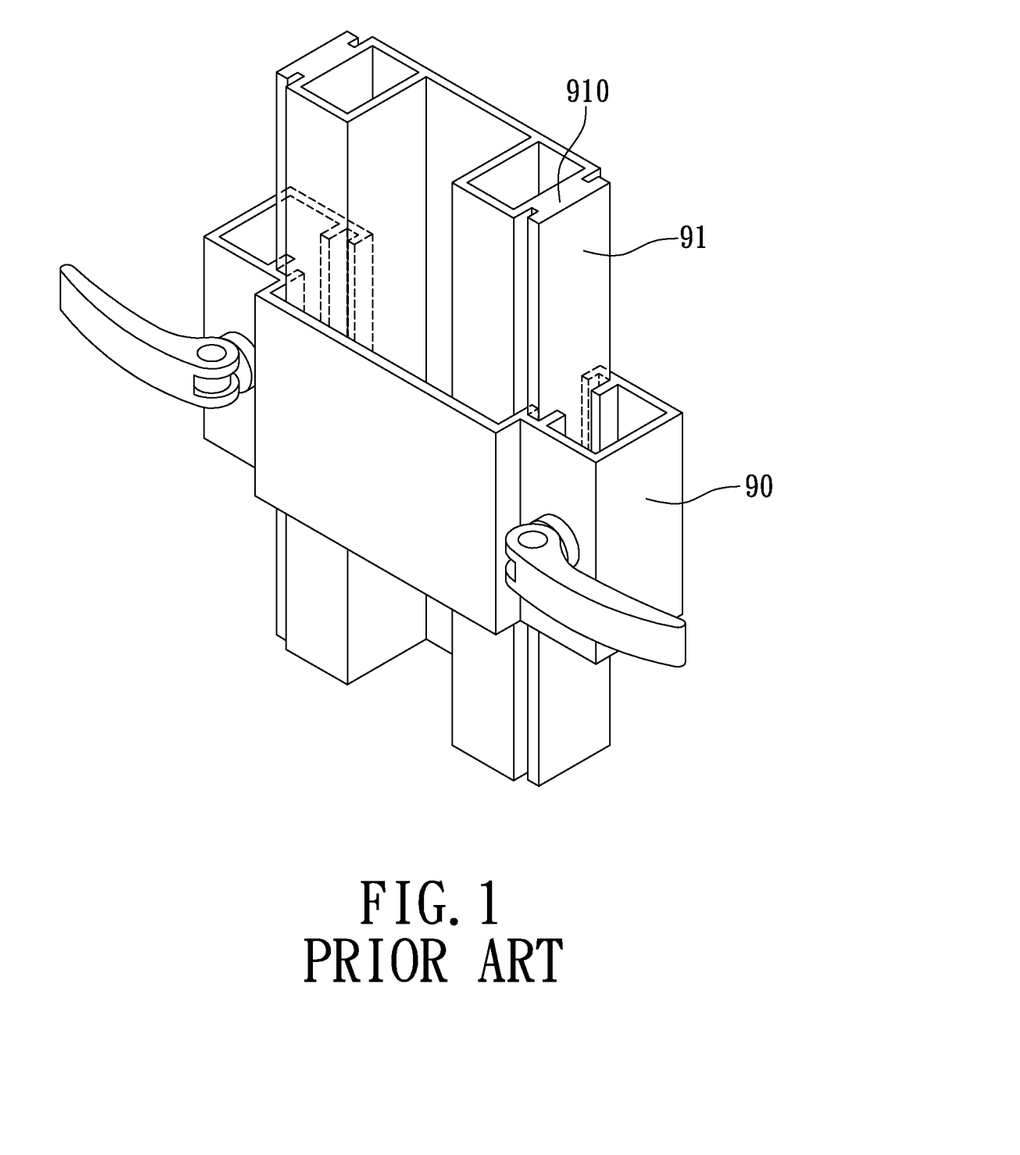
FIG. 1 shows a perspective view of the lifting module according to the prior art.

Referring to the prior art as shown in FIG. 1, when a sliding element 90 is fitted on a track 91 (i.e., the sliding element 90 is penetrated by the track 91), the sliding element 90 can slide along the track 91. However, to assemble the sliding element 90 to the track 91, the sliding element 90 must be slide onto the track 91 from one end thereof (e.g., top end 910). And, the sliding element 90 needs to be moved to the top end 910 of the track 91, before the sliding element 90 can be detached from the track 91. Even worse, when more than one sliding elements (not shown) are disposed on the track 91, to change out the bottommost sliding element 90, the sliding elements 90 above the bottommost sliding element 90 need to be removed from the top end 910 of the track 91 first. Thus, how to increase the convenience of assembling and detaching the sliding element 90 is an important topic.

SUMMARY OF THE INVENTION

One aspect of the instant disclosure relates to a detachable lifting stand that can be assembled or disassembled conveniently for a user.

One of the embodiments of the instant disclosure provides a detachable lifting stand, which comprises: a fixing support, a sliding unit, a mounting unit, and at least one fastening element. The fixing support has a first track defining a first space and a second track defining a second space. The cross-sections of the first space and the second space progressively decrease inwardly of the fixing support. The sliding unit includes a first sliding element detachably disposed on the first track and a second sliding element detachably disposed on the second track. The first sliding element has a first pressing portion formed on one end thereof and received in the first space, and the second sliding element has a second pressing portion formed on one end thereof and received in the second space. The mounting unit includes a mounting element detachably disposed on the sliding unit. The fastening element removably interconnecting the first sliding element and the second sliding element. The first pressing portion and the second pressing portion are respectively received in the first space and the second space and respectively engaging the first track and the second track to lock the sliding unit by adjusting the fastening element.

More precisely, the cross-sections of the first space and the second space are trapezoid-shaped, and the cross-sections of the first pressing portion and the second pressing portion are respectively the same as that of the first space and the second space.

More precisely, the first track has two first inclined surfaces facing across each other and a first center surface connected therebetween, and the second track has two second inclined surfaces facing across each other and a second center surface connected therebetween. The first pressing portion of the first sliding element has two first contacting surfaces and a first surface connected therebetween, and the second pressing portion of the second sliding element has two second contacting surfaces and a second surface connected therebetween. When the first pressing portion and the second pressing portion are respectively received in the first space and the second space and respectively engaging the first track and the second track, the first contacting surfaces are slidably disposed on the first inclined surfaces and the second contacting surfaces are slidably disposed on the second inclined surfaces.

More precisely, when the first pressing portion and the second pressing portion are respectively received in the first space and the second space and respectively engaging the first track and the second track, the first surface and the first center surface are spaced apart from each other and the second surface and the second center surface are spaced apart from each other.

More precisely, the first sliding element includes a first C-shaped sliding block disposed on the first track, and the second sliding element includes a second C-shaped sliding block disposed on the second track and an auxiliary sliding block connected to the second C-shaped sliding block and disposed on the front surface of the fixing support. The first pressing portion is formed on one end of the first C-shaped sliding block, and the second pressing portion is formed on one end of the second C-shaped sliding block away from the auxiliary sliding block.

More precisely, the first C-shaped sliding block defines at least one through hole, and the auxiliary sliding block defines at least one blind hole aligned axially to the through hole and separated from the through hole by a predetermined distance. The fastening element removably penetrates the through hole and the blind hole to fix the relative position of the first sliding element with respect to the second sliding element and respectively position the first sliding element and the second sliding element on the first track and the second track.

More precisely, the auxiliary sliding block of the second sliding element defines at least one positioning groove. The mounting element has at least one positioning block detachably disposed in the positioning groove, and the mounting unit includes a securing element for connecting the mounting element and the auxiliary sliding block.

More precisely, the auxiliary sliding block defines a first fixing hole, the mounting element defines a second fixing hole aligned axially to the first fixing hole, and the securing element penetrates the first fixing hole and the second fixing hole.

More precisely, the positioning groove is a T-shaped groove straddling the top surface and the front surface of the auxiliary sliding block, and the positioning block is a T-shaped block for matchingly engaging the T-shaped groove.

More precisely, the fastening element is a screw.

Therefore, by detachably disposing the first sliding element on the first track and the second sliding element on the second track, the user may detachably assemble the sliding unit to the front portion of the fixing support. Thus, the assembling and disassembling process is more convenient.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Figure 2A:
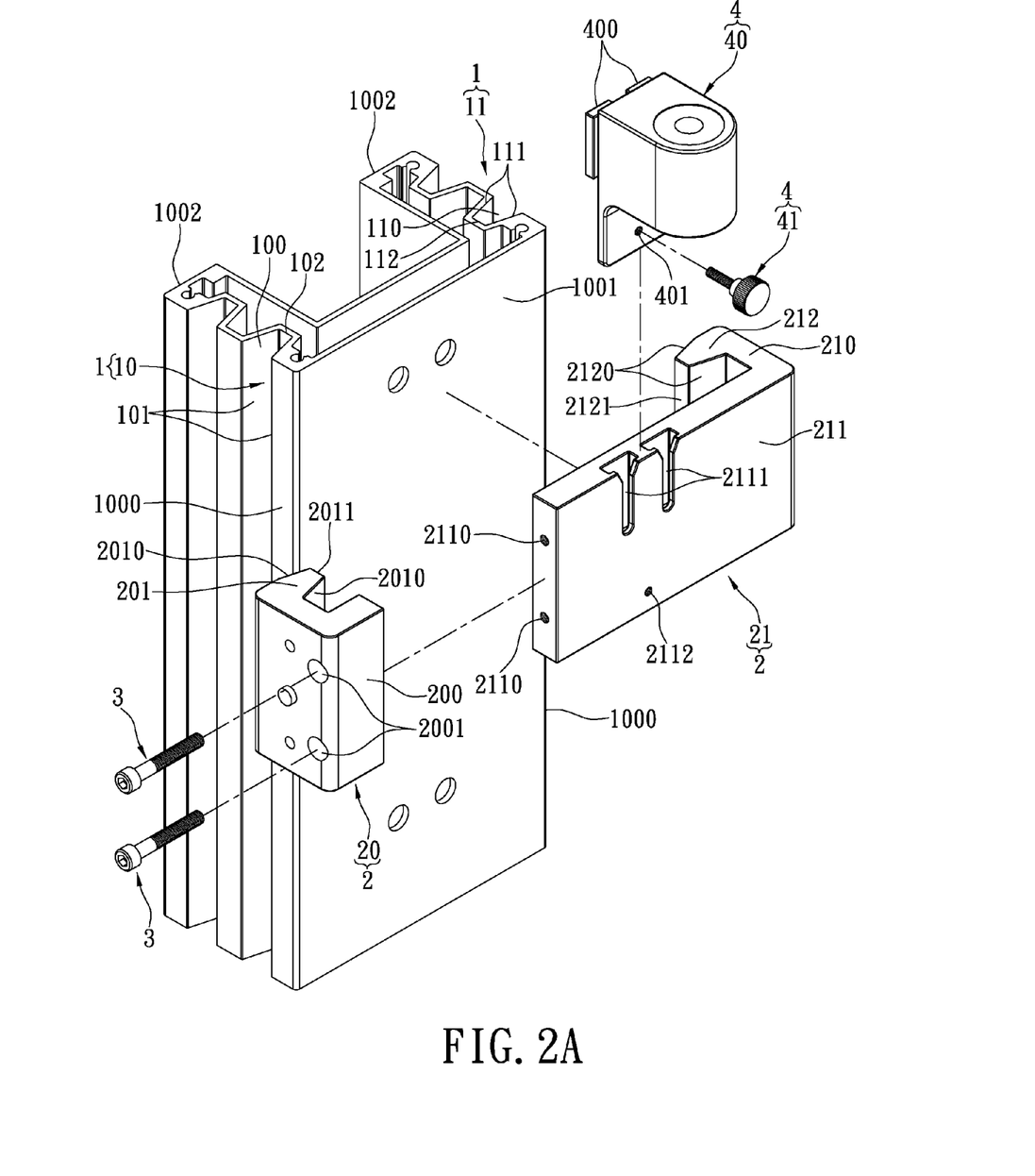
FIG. 2A shows an exploded view of the detachable lifting module according to the instant disclosure.
Figure 2B:
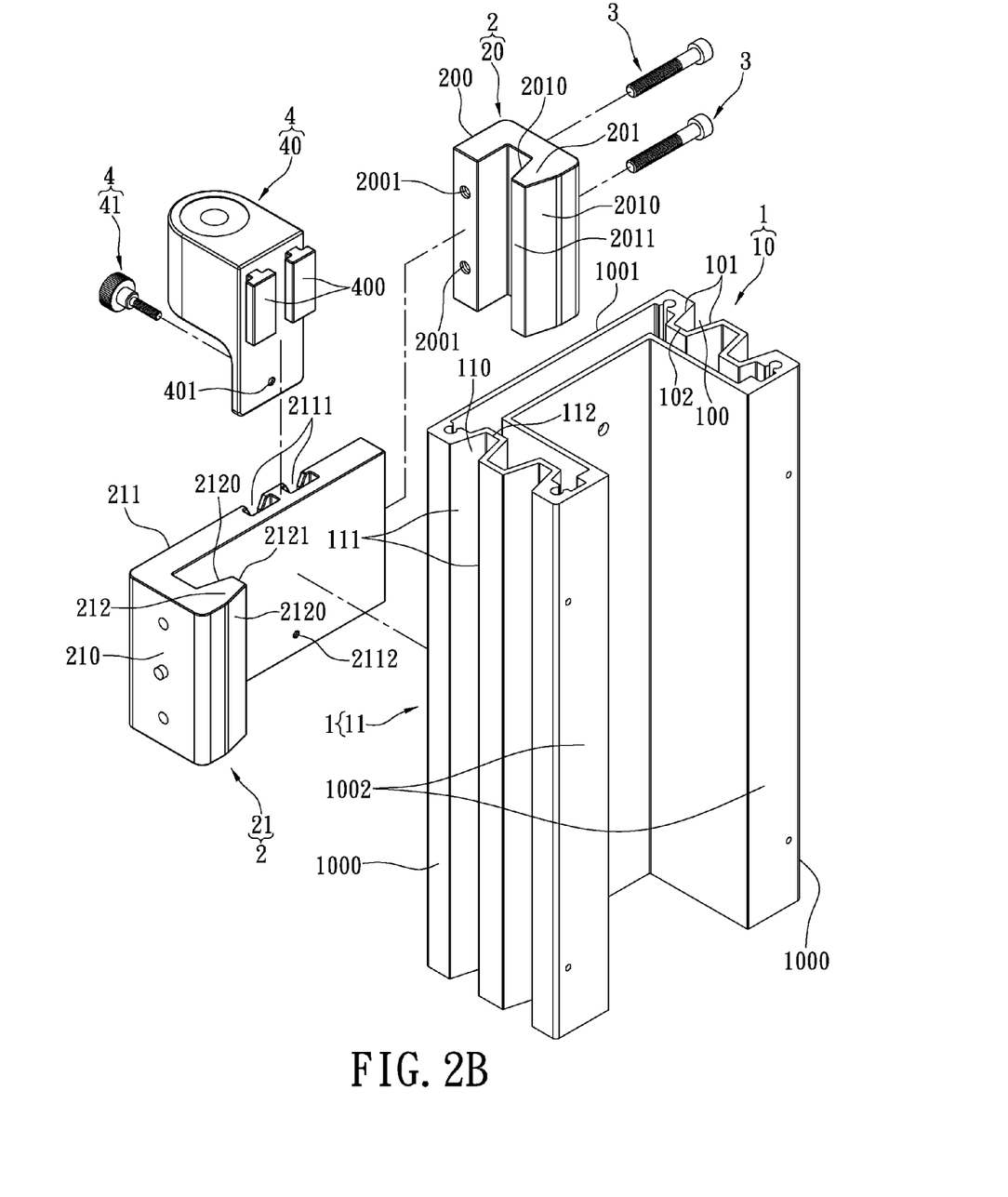
FIG. 2B shows another exploded view of the detachable lifting module according to the instant disclosure.
Figure 3:
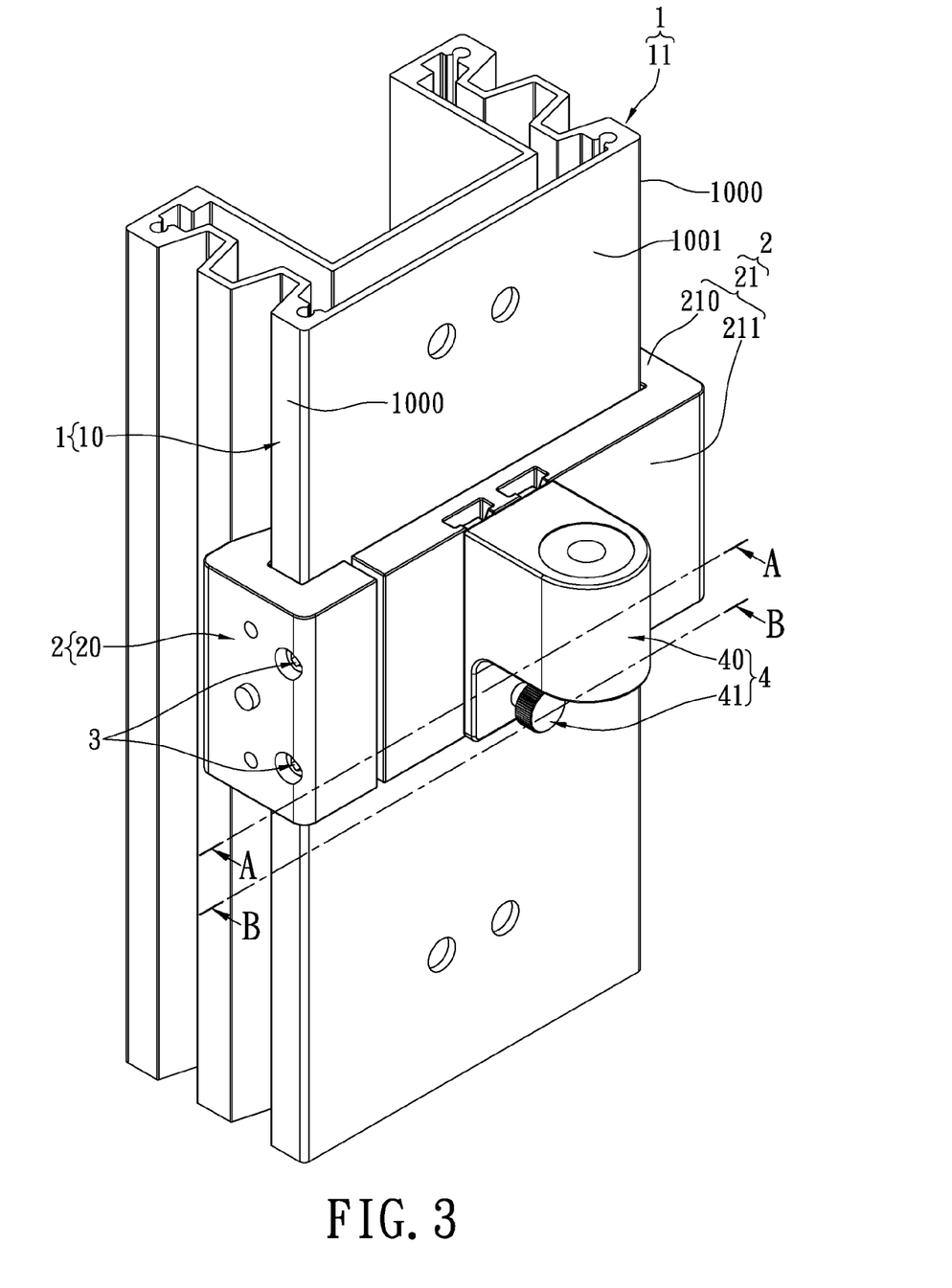
FIG. 3 shows a perspective view of the detachable lifting module according to the instant disclosure.

Referring to FIG. 2A and FIG. 3, where the instant disclosure provides a detachable lifting module, comprising: a fixing support 1, a sliding unit 2, at least one fastening element 3, and a mounting unit 4.

Figure 4:
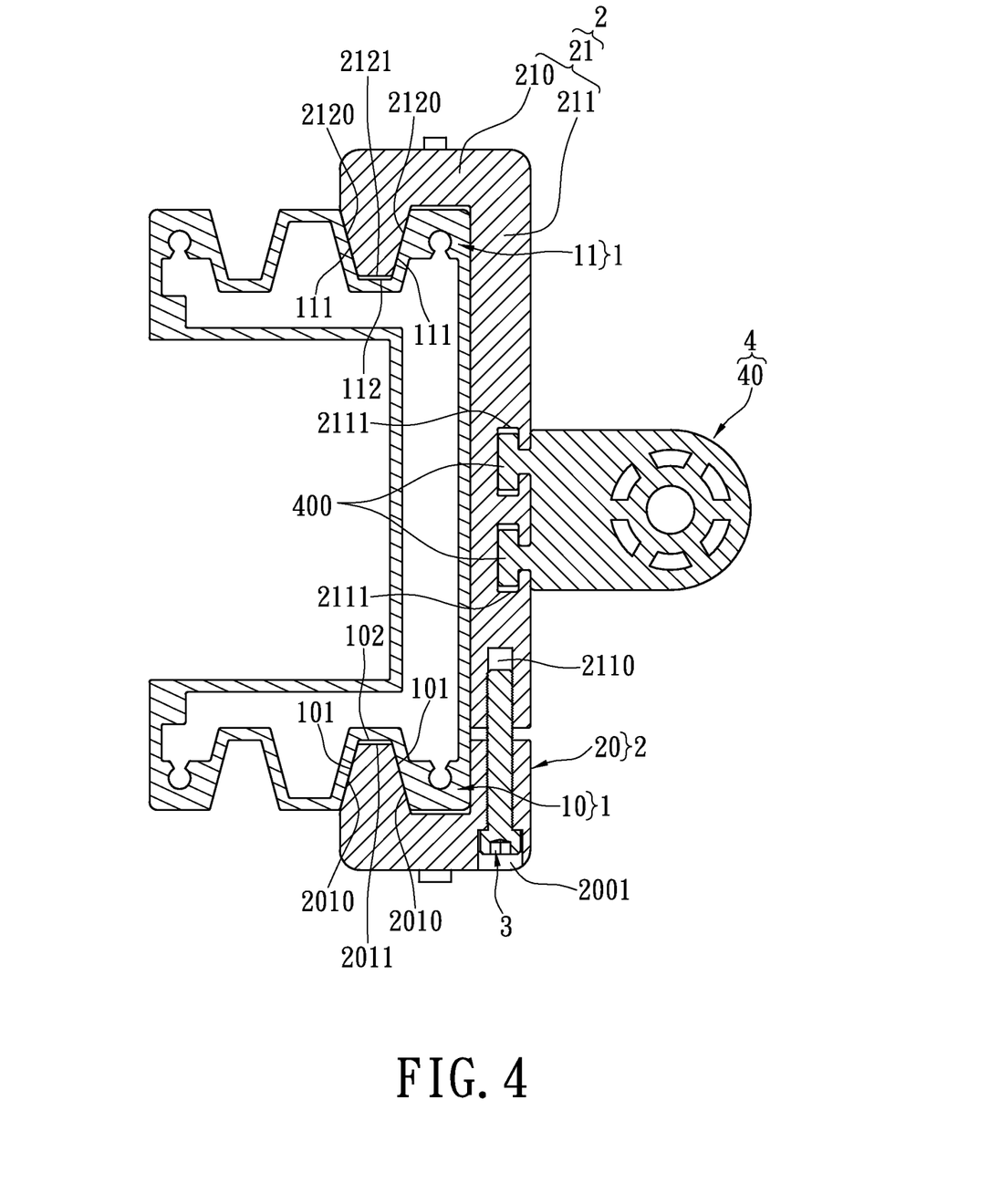
FIG. 4 shows a cross-sectional view taken along the section line A-A of FIG. 3.

First, referring to FIG. 2A, FIG. 3 and FIG. 4, the fixing support 1 has a first track 10 and a second track 11 corresponding to the first track 10, where the first track 10 has two first inclined surfaces 101 facing across each other and a first center surface 102 connected therebetween. The first track 10 has a first space 100 defined by the first inclined surfaces 101 and the first center surface 102 cooperatively. The cross-section of the first space 100 gradually decreases inwardly and is substantially trapezoid-shaped. Likewise, the second track 11 has two second inclined surfaces 111 facing each other and a second center surface 112 connected therebetween. The second track 11 has a second space 110 defined by the second inclined surfaces 111 and the second center surface 112 cooperatively. The cross-section of the second space 110 gradually decreases inwardly and is substantially trapezoid-shaped. More precisely, the fixing support 1 may be an elongated U-shaped frame. The fixing support 1 has two lateral surfaces 1000 oppositely arranged, a front surface 1001 connected therebetween, and a rear surface 1002 corresponding to the front surface 1001. For example, the fixing support 1 can be formed by extrusion molding. Hence, after assembling the sliding unit 2 on the fixing support 1 from the front surface 1001 of the fixing support 1, the mounting unit 4 can be positioned in front of the fixing support 1 through the sliding unit 2 (as shown in FIG. 3).

Moreover, referring to FIG. 2A, FIG. 3 and FIG. 4, the sliding unit 2 includes a first sliding element 20 detachably disposed on the first track 10 and a second sliding element 21 detachably disposed on the second track 11. The first sliding element 20 has a first pressing portion 201 formed on one end thereof and slidably received in the first space 100, and the second sliding element 21 has a second pressing portion 212 formed on one end thereof and slidably received in the second space 110. In addition, the first pressing portion 201 of the first sliding element 20 has two first contacting surfaces 2010 and a first surface 2011 connected therebetween, and the second pressing portion 212 of the second sliding element 21 has two second contacting surfaces 2120 and a second surface 2121 connected therebetween.

When the sliding unit 2 is positioned in front of the fixing support 1 (as shown in FIG. 4), the first contacting surfaces 2010 contact the first inclined surfaces 101, with the first surface 2011 spaced apart from the first center surface 102 (i.e., the first surface 2011 typically does not contact the first center surface 102). The second contacting surfaces 2120 contact the second inclined surfaces 111, with the second surface 2121 spaced apart from the second center surface 112 (i.e., the second surface 2121 does not contact the second center surface 112).

More precisely, the first sliding element 20 includes a first C-shaped sliding block 200 disposed on the first track 10, and the second sliding element 21 includes a second C-shaped sliding block 210 disposed on the second track 11 and an auxiliary sliding block 211 integrally connected to the second C-shaped sliding block 210 and disposed on the front surface 1001 of the fixing support 1 (i.e., the second C-shaped sliding block 210 and the auxiliary sliding block 211 can be integrally formed to form an one-piece unit). In addition, the first pressing portion 201 is formed on one end of the first C-shaped sliding block 200, and the second pressing portion 212 is formed on one end of the second C-shaped sliding block 210 away from the auxiliary sliding block 211.

Figure 5:
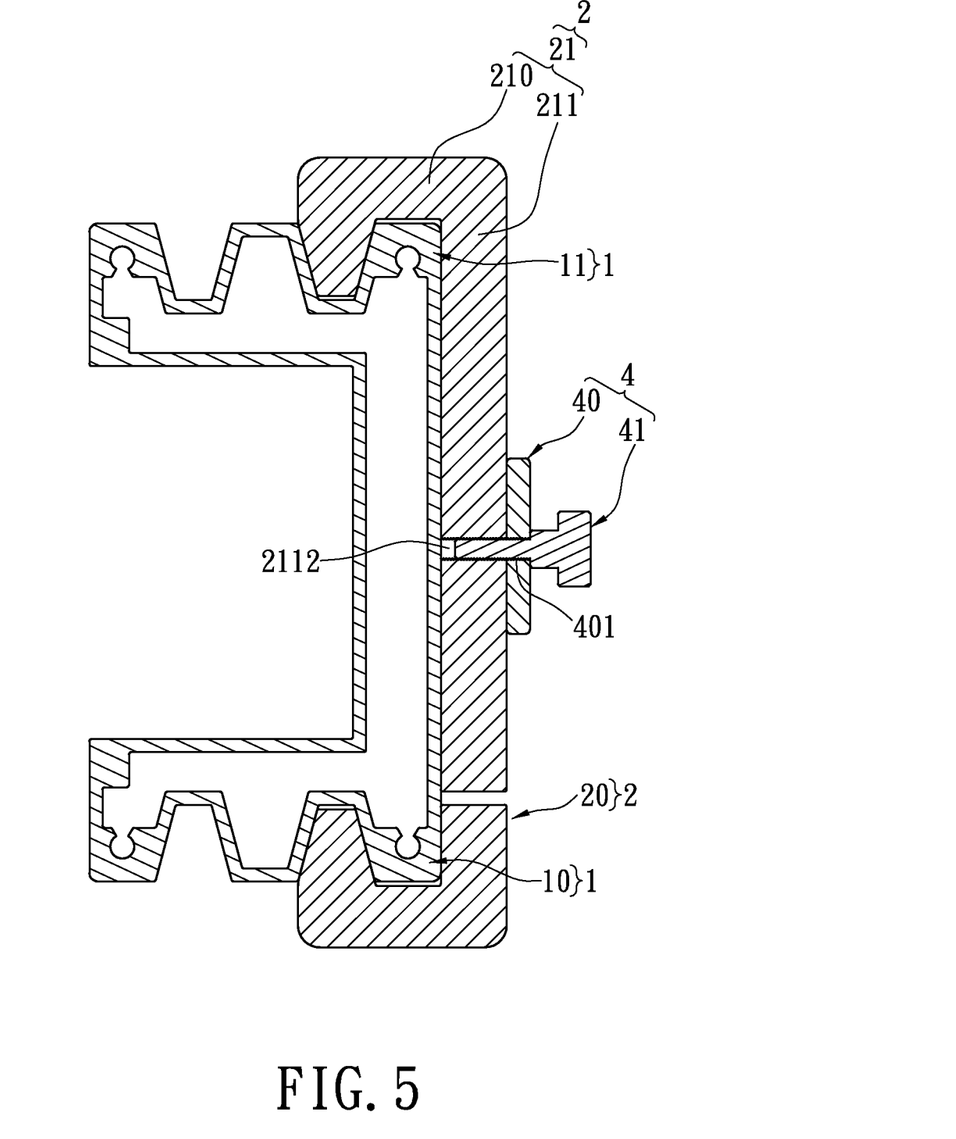
FIG. 5 shows a cross-sectional view taken along the section line B-B of FIG. 3.

Referring to FIG. 2A, FIG. 4 and FIG. 5, when the first sliding element 20 and the second sliding element 21 are connected by the fastening element 3, the first pressing portion 201 and the second pressing portion 212 are respectively received in the first space 100 and the second space 110 from two opposite directions and respectively engage the first track 10 and the second track 11 to position the sliding unit 2 by adjusting the fastening element 3. For example, the fastening element 3 may be a screw, but is not restricted thereto. For the instant disclosure, the number of the fastening elements 3 is not restricted. More precisely, the first C-shaped sliding block 200 defines two through holes 2001. The auxiliary sliding block 211 defines two blind holes 2110 aligned axially to the through holes 2001 and separated from the through holes 2001 by a predetermined distance. The opposite ends of each fastening element 3 is respectively disposed in each corresponding through hole 2001 and each corresponding blind hole 2110 to fix the position of the first sliding element 20 with respect to the second sliding element 21 and respectively position the first sliding element 20 and the second sliding element 21 on the first track 10 and the second track 11.

Next, the method of locking the sliding unit 2 on the fixing support 1 is explained herein. The first sliding element 20 and the second sliding element 21 can be detached from each other. Thus, when the first sliding element 20 and the second sliding element 21 are respectively positioned on two sides (e.g., the first track 10 and the second track 11) of the fixing support 1, the first sliding element 20 and the second sliding element 21 can be connected with each other through the fastening element 3. When the fastening element 3 is tightened, the first and second sliding elements 20 and 21 are squeezed toward the fixing support 1 from opposite directions. In other words, the first pressing portion 201 and the second pressing portion 212 are tightly fitted into the first space 100 and the second space 110 from two opposite directions, respectively. Since the first contacting surfaces 2010 of the first pressing portion 210 are wedged against the first inclined surfaces 101, and the second contacting surfaces 2120 of the second pressing portion 212 are wedged against the second inclined surfaces 111, the sliding unit 2 is locked and cannot be easily moved upward or downward due to the friction force between the fixing support 1 and the sliding unit 2.

In practice, the first sliding element 20 and the second sliding element 21 can be respectively moved along the first track 10 and the second track 11 by adjusting the fastening element 3.

More particularly, referring to FIG. 4, the first track 10 and the second track 11 are substantially trapezoid-shaped. The cross-sections of the first space 201 and the second space 212 are substantially trapezoid-shaped as that of the first pressing portion 201 and the second pressing portion 212. Thus, the contact area (or the total friction force) between the first sliding element 20 and the first track 10 and the contact area (or the total friction force) between the second sliding element 21 and the second track 11 can be increased effectively.

Hence, when the first pressing portion 201 and the second pressing portion 212 are respectively received in the first space 100 and the second space 110 from opposite directions, the trapezoidal shape is better than the rectangular shape. In addition, the utilization of trapezoidal shape that gradually tapers inward provides more dimensional tolerance, thus the parts can be made with less precision.

Furthermore, referring to FIG. 2A, FIG. 4 and FIG. 5, the mounting unit 4 includes a mounting element 40 detachably disposed on the sliding unit 3. The mounting element 40 may be a mounting seat for supporting a display (not shown) or for connecting to a display (not shown) through a movable arm (not shown). In addition, the auxiliary sliding block 211 of the second sliding element 21 defines two positioning grooves 2111 formed on the outer surface of the auxiliary sliding block 211 and a first fixing hole 2112 passing through the auxiliary sliding block 211. The mounting element 40 has a positioning block 400 detachably disposed in the positioning groove 2111 and a second fixing hole 401 corresponding to the first fixing hole 2112. This embodiment using two positioning grooves 2111 and two positioning blocks 400 is merely an example and is not meant to limit the scope of the instant disclosure. Moreover, the mounting unit 4 includes a securing element 41 for connecting the mounting element 40 and the auxiliary sliding block 211, thus the mounting element 40 can be secured on the auxiliary sliding block 211. For example, referring to FIG. 4 and FIG. 5, each positioning groove 2111 is substantially a T-shaped groove straddling the top surface and the front surface of the auxiliary sliding block 211, and each positioning block 400 is substantially a T-shaped block for engaging matchingly to the T-shaped groove, thus the mounting element 40 can be firmly disposed on the front surface of the auxiliary sliding block 211 by matching each corresponding positioning groove 2111 and each corresponding positioning block 400. In addition, when the securing element 41 is driven into the first fixing hole 2112 and the second fixing hole 401, the mounting element 40 can be fixed onto the front surface of the auxiliary sliding block 211.

It's worth mentioning that, the fixing support 1 may have one more pair of tracks respectively formed on the lateral surfaces 1000 and adjacent to the rear surface 1002. Thus, the sliding unit 2 can be assembled on the fixing support 1 from the rear surface 1002 of the fixing support 1 and the mounting unit 4 can be positioned at the back of the fixing support 1 through the sliding unit 2. For this design, a strip-shaped protrusion block is formed between every two corresponding tracks on the same lateral surface 1000 of the fixing support 1. The protrusion block provides additional structural reinforcement.

In addition, when the first sliding element 20 and the second sliding element 21 are engaged to the first track 10 and the second track 11, respectively, the first surface 2011 and the second surface 2121 may contact the first center surface 102 and the second center surface 112, respectively. Thus, the total friction force is increased. However, such configuration has smaller tolerances and requires higher precision.

In conclusion, it is convenient for the user to assemble or detach the sliding unit 2 to/from the front portion of the fixing support 1 through the utilization of the sliding unit 2 including the first sliding element 20 detachably disposed on the first track 10 and the second sliding element 21 detachably disposed on the second track 11. Thus, the assembling and detaching procedures of the sliding unit 2 is more convenient.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A detachable lifting stand, comprising:
   a fixing support having a first track defining a first space and a second track defining a second space, wherein the cross-sections of the first space and the second space progressively decrease inwardly of the fixing support;
   a sliding unit including a first sliding element detachably disposed on the first track and a second sliding element detachably disposed on the second track, the first sliding element having a first pressing portion formed on an end thereof and received in the first space, the second sliding element having a second pressing portion formed on an end thereof and received in the second space;
   a mounting unit including a mounting element detachably disposed on the sliding unit; and
   at least one fastening element detachably connecting the first sliding element and the second sliding element, wherein by adjusting the fastening element, the first pressing portion is selectively disposed in the first space and engaged to the first track and the second pressing portion is selectively disposed in the second space and engaged to the second track to selectively lock the sliding unit;
   wherein the first track has a pair of first inclined surfaces facing across each other and a first center surface connected therebetween, and the second track has a pair of second inclined surfaces facing across each other and a second center surface connected therebetween, wherein the first pressing portion of the first sliding element has a pair of first contacting surfaces and a first surface connected therebetween, and the second pressing portion of the second sliding element has a pair of second contacting surfaces and a second surface connected therebetween, wherein when the first pressing portion and the second pressing portion are respectively received by the first space and the second space and respectively engaging the first track and the second track, the first contacting surfaces are slidably disposed on the first inclined surfaces and the second contacting surfaces are slidably disposed on the second inclined surfaces;
   wherein the first sliding element includes a first C-shaped sliding block slidably engaged to the first track, and the second sliding element includes a second C-shaped sliding block slidably engaged to the second track and an auxiliary sliding block connected to the second C-shaped sliding block and disposed on the front surface of the fixing support, wherein the first pressing portion is formed on one end of the first C-shaped sliding block, and the second pressing portion is formed on one end of the second C-shaped sliding block away from the auxiliary sliding block;
   wherein the auxiliary sliding block of the second sliding element has at least one positioning groove, the mounting element has at least one positioning block detachably engaged to the positioning groove, and the mounting unit includes a securing element for interconnecting the second sliding element and the auxiliary sliding block.

2. The detachable lifting module of claim 1, wherein the cross-sections of the first space and the second space are substantially trapezoid-shaped, and the cross-sections of the first press portion and the second pressing portion are substantially the same as that of the first space and the second space, respectively.

3. The detachable lifting module of claim 1, wherein the first surface and the first center surface are spaced apart from each other, and the second surface and the second center surface are spaced apart from each other.

4. The detachable lifting module of claim 1, wherein the first C-shaped sliding block is formed with at least one through hole, the auxiliary sliding block has at least one blind hole aligned axially to the through hole and separated from the through hole by a predetermined distance, and the fastening element penetrates the through hole and the blind hole to fix the relative position of the first sliding element with respect to the second sliding element and to position the first sliding element and the second sliding element on the first track and the second track, respectively.

5. The detachable lifting module of claim 1, wherein the auxiliary sliding block defines a first fixing hole and the mounting element defines a second fixing hole aligned axially to the first fixing hole, and wherein the securing element penetrates the first fixing hole and the second fixing hole.

6. The detachable lifting module of claim 1, wherein the positioning groove is substantially T-shaped and straddling the top surface and the front surface of the auxiliary sliding block.

7. The detachable lifting module of claim 6, wherein the positioning block is substantially a T-shaped block for matchingly engaging the T-shaped positioning groove.

8. The detachable lifting module of claim 1, wherein the fastening element is a screw.

* * * * *